United States Patent
Hyde et al.

(10) Patent No.: US 9,088,359 B2
(45) Date of Patent: Jul. 21, 2015

(54) MULTI-WAVELENGTH VISIBLE LIGHT COMMUNICATIONS SYSTEMS AND METHODS

(71) Applicant: Elwha LLC, Bellevue, WA (US)

(72) Inventors: Roderick A. Hyde, Redmond, WA (US); Jordin T. Kare, Seattle, WA (US)

(73) Assignee: ELWAH LLC, Bellevue, WA (US)

( * ) Notice: Subject to any disclaimer, the term of this patent is extended or adjusted under 35 U.S.C. 154(b) by 120 days.

(21) Appl. No.: 13/830,585

(22) Filed: Mar. 14, 2013

(65) Prior Publication Data

US 2014/0270791 A1   Sep. 18, 2014

(51) Int. Cl.
H04B 10/00    (2013.01)
H04B 10/116   (2013.01)
H04B 10/114   (2013.01)

(52) U.S. Cl.
CPC .......... *H04B 10/116* (2013.01); *H04B 10/1143* (2013.01); *H04B 10/1149* (2013.01)

(58) Field of Classification Search
CPC ............. H04B 10/112; H04B 10/1123; H04B 10/1129; H04B 10/114; H04B 10/1143; H04B 10/1149; H04B 10/116
USPC .................. 398/118, 119, 126–128, 135, 172
See application file for complete search history.

(56) References Cited

U.S. PATENT DOCUMENTS

| | | | |
|---|---|---|---|
| 2007/0058987 A1 | 3/2007 | Suzuki | |
| 2008/0063410 A1 | 3/2008 | Irie | |
| 2008/0095533 A1 | 4/2008 | Lee | |
| 2008/0170863 A1 | 7/2008 | Won et al. | |
| 2008/0181614 A1 | 7/2008 | Ann | |
| 2008/0298811 A1 | 12/2008 | Son et al. | |
| 2009/0171571 A1 | 7/2009 | Son et al. | |
| 2009/0180780 A1* | 7/2009 | Ann et al. | 398/128 |
| 2009/0208221 A1* | 8/2009 | Sasai | 398/130 |
| 2009/0245806 A1 | 10/2009 | Murayama et al. | |
| 2009/0256062 A1 | 10/2009 | Matsui | |
| 2010/0207546 A1* | 8/2010 | Jung et al. | 315/297 |
| 2011/0069957 A1* | 3/2011 | Kim et al. | 398/75 |
| 2012/0076509 A1* | 3/2012 | Gurovich et al. | 398/212 |

OTHER PUBLICATIONS

Tanaka, Yuichi et al., "Optical Parallel Transmission with Multi-Wavelength for High Speed Communications on Indoor Channels", IEICE Transactions on Communications, vol. E81-B, No. 4, Apr. 4, 1998, pp. 729-736.
Visible-light communication: Tripping the light fantastic, The Economist, Jan. 28, 2012, 3 pages.

* cited by examiner

*Primary Examiner* — Dalzid Singh
(74) *Attorney, Agent, or Firm* — Foley & Lardner LLP

(57) ABSTRACT

A system for transmitting data using light includes a plurality of light sources configured to transmit light at non-overlapping wavelengths, processing electronics, and a diffuser configured to diffuse the transmission of light. The processing electronics assign the plurality of light sources to a plurality of channels, accept a data stream, allocate the data stream to the channels, and modulate a transmission of the light using the allocated data stream, where the allocated data used to modulate a first light source of the plurality of light sources is separate from the allocated data used to modulate a second light source of the plurality of light sources.

18 Claims, 13 Drawing Sheets

MULTI-WAVELENGTH VISIBLE LIGHT COMMUNICATIONS SYSTEMS AND METHODS

BACKGROUND

A basic limit of visible light communication (VLC) systems is that unless a single-point transmitter is used and the transmitter, receiver, or both are actively steered, multipath transmission occurs. Multipath transmission degrades the signal and limits bandwidth. There is a need for improved systems and methods of transmitting and receiving optical data for visible light communication systems.

SUMMARY

One exemplary embodiment relates to a system optically transmitting data. The system includes a plurality of light sources configured to transmit light at non-overlapping wavelengths, an optical spreader configured to spread a transmission of light, and processing electronics. The processing electronics are configured to assign the plurality of light sources to a plurality of channels, accept a data stream, allocate the data stream to the channels, and modulate a transmission of the light using the allocated data stream, wherein the allocated data used to modulate a first light source of the plurality of light sources is separate from the allocated data used to modulate a second light source of the plurality of light sources.

Another exemplary embodiment relates to a method of optically transmitting data. The method includes assigning a plurality of light sources to a plurality of channels, wherein the light sources are configured to transmit light at non-overlapping wavelengths; accepting a data stream; allocating the data stream to the channels; modulating a transmission of the light using the allocated data, wherein the allocated data used to modulate a first light source of the plurality of light sources is separate from the allocated data used to modulate a second light source of the plurality of light sources; and spreading the transmission of light with an optical spreader.

Another exemplary embodiment relates to a system for optically transmitting data. The system includes a non-monochromatic light source configured to emit a spectrum of light, a dispersive device configured to separate the spectrum of light into portions, a modulation device, and processing electronics. The processing electronics are configured to accept a data stream, allocate the data stream to at least two data channels, and control an emission of light by modulating the portions using the modulation device and the data channels, wherein each portion is modulated using a separate data channel.

Another exemplary embodiment relates to a method of optically transmitting data. The method includes accepting a data stream; allocating the data stream to at least two data channels; emitting a spectrum of light from a non-monochromatic light source; directing the spectrum of light through a dispersive device to separate the spectrum into portions; and controlling an emission of light by modulating the portions of the spectrum using the data channels, wherein each portion is modulated using a separate data channel.

Another exemplary embodiment relates to a system for receiving multi-wavelength optical data. The system includes a filtering device configured to filter wavelengths of light, at least one photodetector configured to respond to wavelengths of light, and processing electronics. The processing electronics are configured to accept analog data from at least one photodetector, convert the analog data to digital data, separate the digital data into data segments corresponding to the wavelengths, and arrange the data segments into data streams.

Another exemplary embodiment relates to a method of receiving multi-wavelength optical data. The method includes filtering wavelengths of light using a filtering device; detecting the filtered wavelengths using at least one photodetector; accepting analog data from at least one photodetector; converting the analog data to digital data; separating the digital data into data segments corresponding to the wavelengths; and arranging the data segments into data streams.

Another exemplary embodiment relates to a non-transitory computer-readable medium having instructions stored thereon. The instructions include instructions for assigning each of at least two illumination devices to at least one channel, wherein the illumination devices are configured to illuminate at non-overlapping wavelengths; instructions for accepting a data stream; instructions for allocating the data stream to the channels; and instructions for modulating an illumination of the illumination devices using the allocated data, wherein the allocated data used to modulate a first illumination device is separate from the allocated data used to modulate a second illumination device, and wherein the illumination provided by the illumination devices is spread by an optical spreader.

Another exemplary embodiment relates to a non-transitory computer-readable medium having instructions stored thereon. The instructions include instructions for configuring a plurality of filters to correspond to wavelengths of light; instructions for accepting data from a plurality of photodetectors; instructions for separating the data into data segments corresponding to the wavelengths; instructions for arranging the data segments into data streams; and instructions for outputting the data streams.

The invention is capable of other embodiments and of being carried out in various ways. Alternative embodiments relate to other features and combinations of features as may be generally recited in the claims.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

The invention will become more fully understood from the following detailed description taken in conjunction with the accompanying drawings wherein like reference numerals refer to like elements, in which.

DETAILED DESCRIPTION

Figure 1:
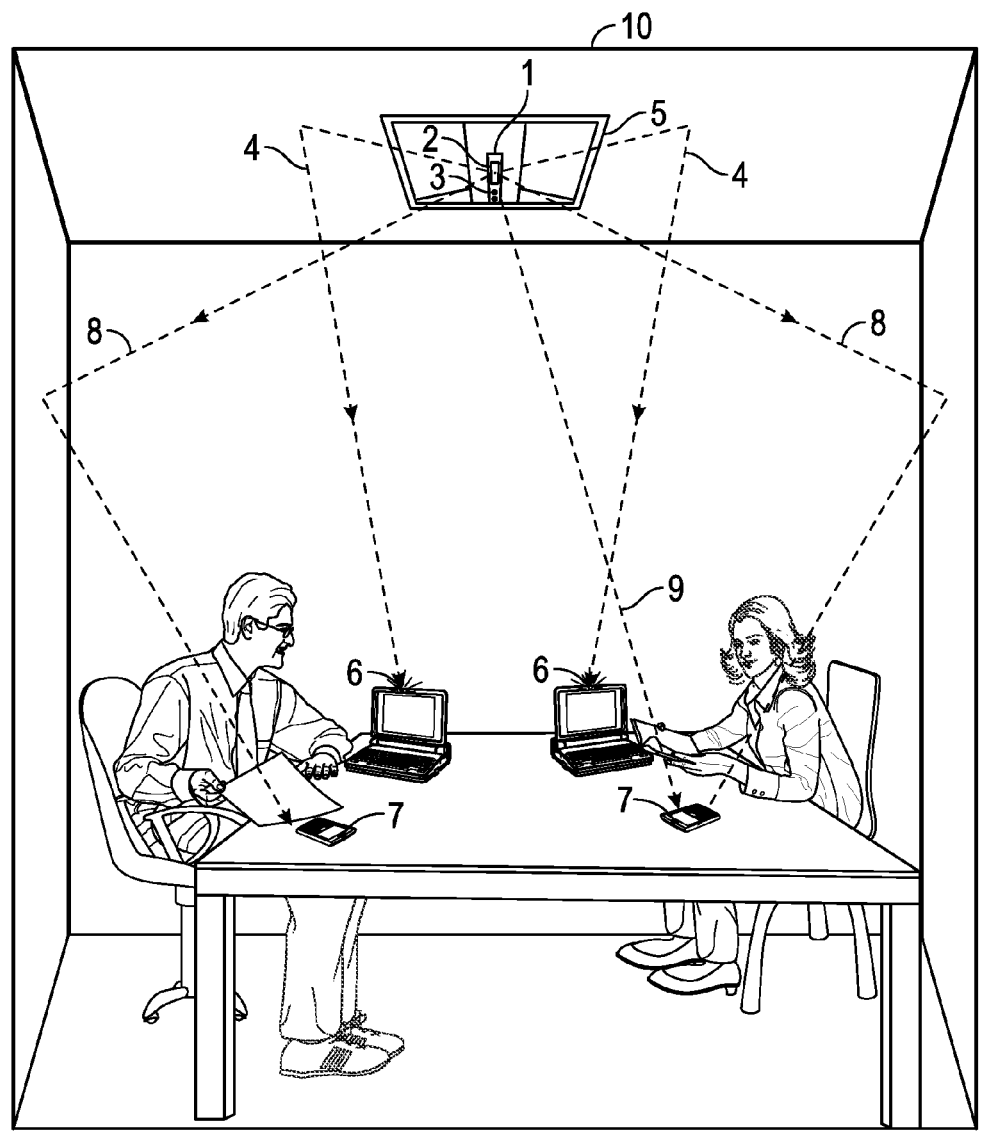
FIG. 1 is a schematic diagram of multi-wavelength VLC system, including a transmitting device and receiver, configured for using the systems and methods of this disclosure, shown according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods are shown for visible light communication. Data may be transmitted optically using light at multiple wavelengths. If an optical transmission is not actively steered so that a transmission is received directly by a receiver, multipath transmission can occur (e.g., light reflecting off of a wall, ceiling, etc.). Multipath transmission degrades the transmitted signal and thus reduces the overall bandwidth. However, by using multiple wavelengths during a transmission, each modulated at a comparatively low bandwidth, an increased total bandwidth may be provided, despite multipath transmission.

The transmitted signal may be generated by modulating certain frequencies of light, where the modulations correspond to data bits to be transmitted. The modulations may be controlled in a manner such that a constant visual brightness and color is perceived by a viewer. The modulations may also be controlled to have a frequency and average duty-cycle at rates where flickering is not perceptible by the average human eye. The light to be modulated may be generated by laser devices, non-monochromatic light emitters, LED illuminators, superradiant diodes, phosphor light sources, arc sources, etc. Laser devices may be individually or collectively wavelength-locked laser devices, or temperature controlled laser devices. While the present disclosure discusses laser devices or LED illuminators, it should be understood that other types of illumination devices and light sources may be used to according to the systems and methods herein.

A transmitted signal may be received using a receiver configured according to the systems and methods herein. The receiver may use filters to select certain wavelengths of light, where the wavelengths selected correspond to wavelengths used to transmit data by the transmitters described herein. The receiver may process the modulations of the selected wavelengths and covert the modulations into data. The data corresponds to the data transmitted. The receiver may also enable and disable the filtering of certain frequencies, thereby allowing the selection of certain channels of data.

According to one contemplated scenario, a transmitter configured for using the systems and methods herein may be located in a light fixture of a conference room. Receivers configured according to the systems and methods herein may be located in the laptop computers of conference attendees. The systems and methods described herein may generate a data signal that is transmitted using light. The data signal may be embedded in multiple wavelengths of light. The data, for example, may be related to a presentation to be streamed to the attendees. The systems and methods described herein may then cause the receivers to process the transmitted signal into useable data so that the attendees may view the presentation.

According to another contemplated scenario, a transmitter configured for using the systems and methods herein may be located in the light fixture of a board room. Receivers configured according to the systems and methods herein may be located in the laptop computers of meeting attendees. In this scenario, certain attendees may need to receive a presentation that is different from other attendees. The systems and methods described herein may then generate a data signal that is transmitted using light. The data signal may be embedded in multiple wavelengths of light, where one set of wavelengths corresponds to a first channel of data, and a second set of wavelengths corresponds to a second channel of data. The attendees may configure their receivers to accept data from the first or second channel. The systems and methods described herein may then cause the receivers to process the transmitted signal corresponding to the channel selected, transform the signal into useable data, and thereby allow the attendees to view the appropriate presentation.

For purposes of this disclosure, the term "coupled" means the joining of two members directly or indirectly to one another. Such joining may be stationary in nature or moveable in nature and such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring to FIG. 1, a schematic diagram of multi-wavelength VLC system 10 is shown. Transmitting device 1 and receivers 6 and 7 are also shown. Transmitting device 1 is shown as being coupled to illuminating device 5. Illuminating device may be a light fixture, a lamp, or any other illuminating device. Although transmitting device 1 is depicted as coupled to illuminating device 5, it should be understood that transmitting device 1 may be a standalone transmitter. Transmitting device 1 is depicted as having processing electronics 2 and transmitter module 3. Processing electronics 2 may be any suitable processing system. Transmitter module 3 is depicted as using laser diode devices, but also may use LED illuminators, or any other suitable means of generating light. Receiver 6 is shown as being coupled to a laptop computer, and receiver 7 is shown as being coupled to a cellular phone. Although receivers 6 and 7 are shown as coupled to a mobile electronic device, receivers 6 and 7 may be coupled to any suitable electronic device, or may be standalone receivers. Transmitted light signals 4 and 8 are encoded with data and are depicted as a multipath transmissions, but may also be a direct transmission 9. In this instance, receivers 6 and 7 may receive different data streams according to different channels of data. In another instance, there may be only one channel and one data stream. It should be appreciated that any combination of channels, transmitting devices, receivers, and illuminating devices may be implemented in multi-wavelength VLC system 10 without departing from the scope of the present disclosure.

Processing electronics 2 may be configured to accept a data stream as an input, and control the modulation of light corresponding to data bits of the data stream. Processing electronics 2 may be further configured to control modulation in a manner that a viewer would not be able to perceive any modulation. For example, a user of a laptop coupled to receiver 6 would not be able perceive a flickering of light as the user is receiving data, even though processing electronics 2 is modulating the light.

According to an exemplary embodiment, transmitting device 1 may be an LED display coupled to a computing device. Processing electronics 2 may be the processing electronics of the computing device, transmitter module 3 may use LED illuminators in the LED display, and receiver 6 may be a cellular phone. The LED display may be used to transmit data to customers in a retail store about a sale or product. For example, a customer who has a cell phone may be walking by the display, and have a cellular phone out and configured to accept transmissions from the LED display, and may receive a coupon that is sent to the cellular phone by the LED display.

Figure 2:
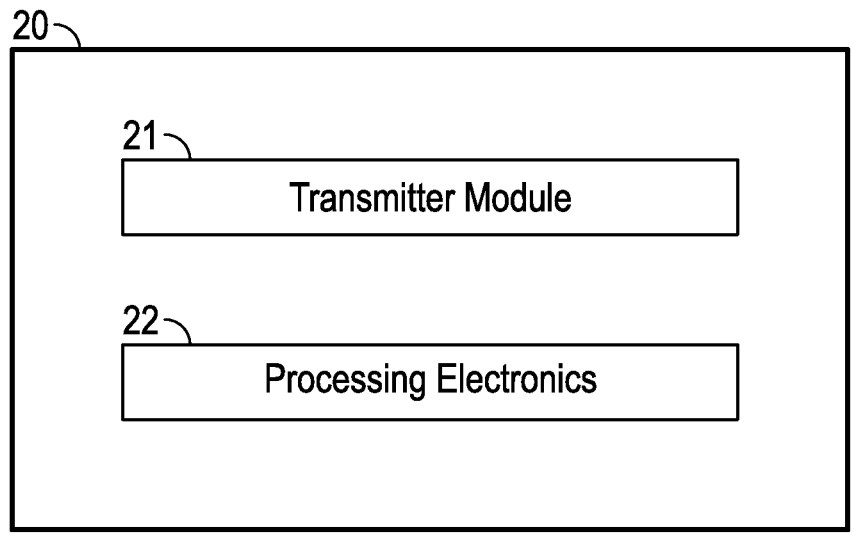
FIG. 2 is a block diagram of a system for transmitting data optically using lasers of differing wavelengths, shown according to an exemplary embodiment.

Referring to FIG. 2, a block diagram of transmitting device 20 is shown, configured for using the systems and methods of this disclosure. Transmitting device 20 includes transmitter module 21 and processing electronics 22. Processing electronics 22 used to control the modulation and transmission of data are shown in greater detail in FIG. 4. Transmitter module 21 includes all components necessary to generate light. Processing electronics 22 includes all components necessary to control transmitter module 21.

According to an exemplary embodiment, transmitter module 21 includes laser diodes and an optical spreader. The optical spreader is configured to spread/distribute the output of each laser. For example, the optical spreader may include a diffuser or a microlens array, or any other optical system configured to distribute light over an area. The laser output is modulated as controlled by processing electronics 22. The optical spreader prevents the modulated laser output from being hazardous to humans and causes the modulated laser output to uniformly scatter or illuminate the environment.

According to an exemplary embodiment, transmitter module 21 includes an LED illuminator, a dispersive device, and modulation device. The dispersive device is configured separate the spectrum of light generated by the LED illuminator into different wavelength portions. Processing electronics 22 controls the modulation device, which modulates the separated wavelengths to encode a data stream. The modulation device may be an LCD device, a micromirror array, or any other device capable of modulating light.

Figure 3:
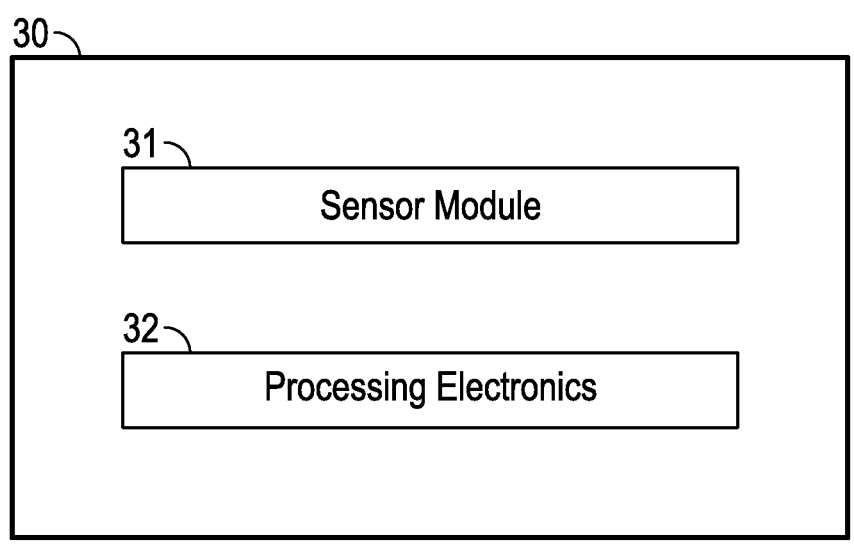
FIG. 3 is a block diagram of a system for receiving optical data that was transmitted using multiple wavelengths, shown according to an exemplary embodiment.

Referring to FIG. 3, a block diagram of receiver 30 is shown, configured for using the systems and methods of this disclosure. Receiver 30 includes sensor module 31 and processing electronics 32. Processing electronics 32 used to control the reception of data is shown in greater detail in FIG. 5. Sensor module 31 includes detectors, filters, and all components necessary to detect light. Processing electronics 32 includes all components necessary to control sensor module 31.

According to an exemplary embodiment, sensor module 31 includes filters, two photodetectors and two analog-to-digital converters. Light passes through the filters, and wavelengths of light not being used for data transmission are filtered out. Each filter may be configured for certain wavelengths. Channels and their corresponding wavelengths that are used for data transmission may be selected based on default values, based on a configuration data file, or based on a user preferences file stored in processing electronics 32. Channels may also be configured based on scanning of possible wavelengths for transmissions, or on transmissions having specific characteristics. Channels may further be configured according to the destination (e.g., whether the transmission is intended for a particular recipient or class of recipients). Channels may be configured based on the data being transmitted. For example data may be sent across multiple data channels. Filtered light is detected by the photodetectors. The signal from the photodetectors is sent to the analog-to-digital converters. The output of the analog-to-digital converters is sent to processing electronics 32. Processing electronics 32 receive the input and perform the processing necessary to form a received data stream corresponding to the data transmission.

According to another exemplary embodiment a certain channel may be designated as a guide, or library channel. The guide channel generally includes index data related to channels in use, available channels, channel types, wavelength information, network information, statuses, etc., and serves as a network directory for devices connecting to an optical network implemented using the systems described herein. The directory information may also be used in assigning a channel to a device. Directory information may be transmitted using the wavelength, or wavelengths, assigned to the guide channel. For example, a channel based on wavelengths from 570-580 nm may be designated as the guide channel. Directory information may be sent continuously or periodically to allow a device to join the optical network, and access the directory in configuring itself for transmission. For example, the directory may specify that a channel is open for communication, and the device may configure itself to communicate utilizing the open channel. As another example, the directory may specify that a certain data type (e.g., a video or audio stream) is being transmitted on a certain channel, and the device may be configured to receive the data according to the channel. According to another embodiment, the directory information may be transmitted to devices via communication means other than the guide channel of the optical network. For example, a device may receive the directory information through a WIFI connection. As another example, a device may receive the directory information through an Ethernet network connection. As another example, a device may receive the directory information through a Bluetooth connection.

Figure 4:
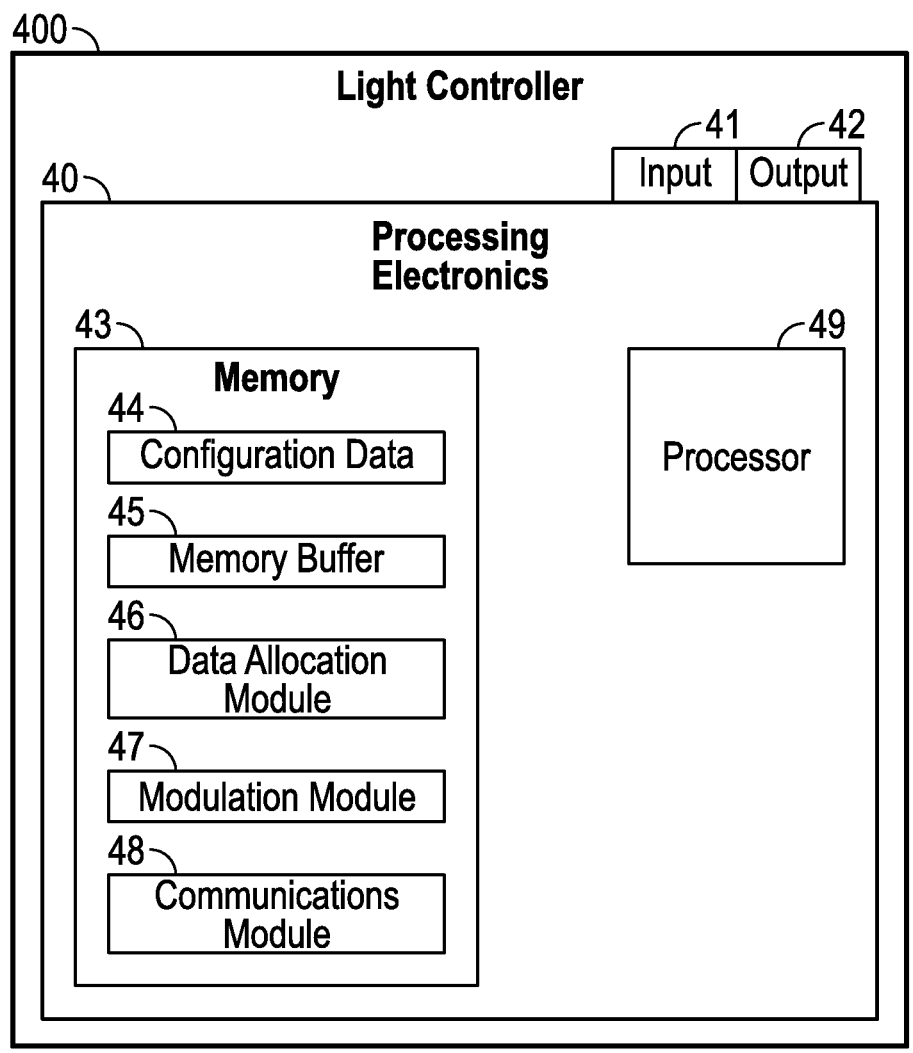
FIG. 4 is a detailed block diagram of a light controller, show according to an exemplary embodiment.

Referring to FIG. 4, a more detailed block diagram of light controller 400 is shown, according to an exemplary embodiment. Light controller 400 may be coupled to an electronic device, or light controller 400 may be a standalone device. Light controller 400 includes processing electronics 40, configured for completing the systems and methods of the present disclosure. Processing electronics 40 may be processing electronics 22 of transmitting device 20 in FIG. 2, processing electronics 61 of transmitting device 60 in FIG. 6, processing electronics 71 of transmitting device 70 in FIG. 7, or processing electronics 81 of transmitting device 80 in FIG. 8. Processing electronics 40 are generally configured to receive an input of a data stream. The data stream may be of packets or other data to be transmitted to receivers (e.g., a stream of video data, presentation data, image data, file data, security data, etc.). Processing electronics 40 are configured to process the data stream and allocate it to the transmitter module, based on a number of transmission channels and a number of transmitters used for each channel. Processing electronics 40 are configured to modulate the output of transmitters using the allocated data streams. For example, if transmitters A and B are assigned to channel one, processing electronics 40 uses data allocated to channel one to modulate transmitters A and B. Further, if transmitters C and D are assigned to channel two, processing electronics 40 uses data allocated to channel two to modulate transmitters C and D. Wavelengths of light used for transmission may correspond to different channels or different data segments. For example, channel one transmission may use a 635 nm wavelength, and channel two transmission may use a 670 nm wavelength. In another embodiment transmitters E and F may be assigned to channel one, where transmitter E is configured for 635 nm, and transmitter F is configured for 670 nm. Processing electronics 40 may allocate different segments of channel one data to transmitters E and F for transmission in parallel, thereby increasing transmission rate. Processing electronics 40 may also control any filters or dispersive devices. Processing electronics 40 are further configured to provide output necessary to interface with configuration or networking devices.

Processing electronics 40 includes processor 49. Processor 49 may be implemented as a general purpose processor, an application specific integrated circuit (ASIC), one or more field programmable gate arrays (FPGAs), a group of processing components, or other suitable electronic processing components.

Processing electronics 40 includes memory 43. Memory 43 is one or more devices (e.g., RAM, ROM, Flash memory, hard disk storage, etc.) for storing data and/or computer code for completing and/or facilitating the various processes described herein. Memory 43 may be or include non-transient volatile memory or non-volatile memory. Memory 43 may include data base components, object code components, script components, or any other type of information structure for supporting the various activities and information structures described herein. Memory 43 may be communicably connected to processor 49 and includes computer code or instructions for executing one or more processes described herein.

Memory 43 includes memory buffer 45. Memory buffer 45 is configured to receive data through input 41. The data may be in the form of network packets, or may correspond to other suitable protocols. The data may also include configuration data provided by another electronic device, or any other data. The data may be stored in memory buffer 45 and accessed by the modules of memory 43 as needed. As an example, configuration data may be stored in memory buffer 45, and accessed by data allocation module 46, modulation module 47, and communications module 48. As another example, a data stream to be transmitted may be stored in memory buffer 45 before it is processed.

Memory 43 includes configuration data 44. Configuration data 44 includes data related to processing electronics 40. Configuration data 44 may include set up data and data used to configure communications between the various modules and components of processing electronics 40. Configuration data 44 may be used to set a modulation pattern and transmission rate. For example, a transmission rate may be specified to be less than the inverse of an optical multipath time in an environment. Configuration data 44 may be used to configure channels of transmission. Configuration data 44 may also be used to configure data allocation to channels, and the allocation of data within channels. Configuration data 44 may also be used to configure the size and location of segments of data to be allocated. As an example, configuration data 44 may configure communication between data allocation module 46 and modulation module 47. Configuration data 44 may also be used to configure which transmitters are active and which transmitters modulation module 47 may control.

Memory 43 further includes data allocation module 46. Data allocation module 46 is responsible for allocating a stream of data to be transmitted to the transmitters. Data allocation module 46 may access configuration data 44 to configure the allocation of the data stream. Data allocation module 46 may access a data stream stored in memory buffer 45. Data allocation module 46 may use data structures related to allocating data (e.g., tables, arrays, linked lists, trees, abstract data structures, etc.). In an exemplary embodiment, data allocation module 46 may determine data and channel allocation based on configuration data 44. In one example, the configuration data may correspond to a number of client devices. There may be four clients connected to the system, and four channels of data. In another example, frequency-division multiple access (FDMA) negotiations may be used to assign channels, and the channel assignments may be stored in configuration data 44. Data allocation module 46 may access the channel assignment information.

In another embodiment, data and channel allocation may be based on preference data. For example, processing electronics 40 may be configured for use with two laser transmitters, each configured to transmit data on a single channel. Data allocation module 46 is responsible for apportioning a source data stream between the two transmitters. As an example, a data stream may be TCP packets, and data allocation module 46 may select a first packet to be transmitted by a first transmitter, and a second packet to be transmitted by a second transmitter. Data allocation module 46 may pass the allocated packet data to modulation module 47, including information related to what transmitter each packet has been allocated.

In an exemplary embodiment, processing electronics 40 is configured for use with two laser transmitters, where the first laser is configured to transmit data on a channel different from the second laser. Data allocation module 46 may be responsible for apportioning a source data stream between the two transmitters. As an example, the data stream may be TCP packets, and data allocation module 46 may select a first packet corresponding to channel one data to be transmitted by the first laser, and a second packet corresponding to channel two data to be transmitted by the second laser. Data allocation module 46 passes the allocated packet data to modulation module 47, including information related to what laser each packet has been allocated. As another example, the data stream may be of image data, where a first image is to be transmitted on a first channel, and a second image is to be transmitted on a second channel. Data allocation module 46 allocates the image data between the first and second channels.

Although the previous examples referred to two transmitters, it should be understood the scope of the present disclosure is not limited to two transmitters. Similarly, although the previous examples referred to one or two channels, it should be understood the scope of the present disclosure is not limited to a particular number of channels. As an example, processing electronics 40 may be configured for six transmitters to operate over three channels. In this example, each channel may then correspond to two individual transmitters.

Memory 43 further includes modulation module 47. Modulation module 47 is configured to accept data from data allocation module 46. The data from data allocation module 46 may include data to be transmitted, and any corresponding channel and transmitter information. Channel and transmitter information may be generated by data allocation module 46 as described above. Channel and transmitter information is used by modulation module 47 to determine which transmitter to modulate. For example, a block of data may have an associated data segment that specifies it corresponds to a first channel. Modulation module 47 may read the data from data allocation module 46 and generate modulation signals to control the appropriate first channel transmitters based on the data. The modulation signals may be sent to the transmitters and related components. In an exemplary embodiment, modulation module 47 may receive a byte of data to transmit. Modulation module may send modulation signals for the byte of data. Modulation signals may include signals to increase and decrease the intensity of a transmitter, and thereby encode the byte within the modulated transmission. Modulation signals also include all others signals required to adjust various aspects of a transmitter. As one example, modulation signals may include signals to enable or disable a transmitter.

In an exemplary embodiment, modulation module 47 is configured to modulate laser transmitters at a rate such that a constant visual brightness is maintained. Modulation module 47 may be further configured to modulate at a rate such that a constant color is maintained. As an example, the average duty cycle of the transmitters can be configured for a fixed average rate that is below the threshold of which an average human can detect flickering. In order to eliminate perceptible flickering, modulation module 47 may adjust the frequency of the modulation, the amplitude or intensity of the modulation, the average intensity of the modulation, and any related wavelengths and parameters of the transmitters and modulation devices.

In an exemplary embodiment, modulation module 47 adjusts the modulation rate based on feedback from a receiver. For example, a receiver may provide feedback corresponding to a transmission success rate or signal strength. In response to the feedback, modulation module 47 may then adjust the modulation to maintain the best feasible data transfer rate for the environment.

In an alternative embodiment, modulation module 47 may adjust a modulation rate of additional illumination devices. For example, processing electronics 40 may be coupled to a separate LED illumination device (e.g., a sign, an electronic display, etc.). Modulation module 47 may modulate the LED illumination device in coordination with modulation as described above to maintain a desired overall color or intensity average.

Memory 43 further includes communications module 48. Communications module 48 is configured to provide communication capability with other devices via output 42. As an example, the communications module 48 may be configured to provide information corresponding to packet loss or data transfer rate to another network device. The network device may be a server or a router that is providing a data connection through input 41. The communications module 48 may include logic for supporting communications protocols (e.g., internet protocol (IP), transmission control protocol (TCP), file transfer protocol (FTP), etc.) or supporting server-client or peer-to-peer network relationships.

Processing electronics 40 further includes input 41 and output 42. Output 42 is configured to provide an output to a device as described herein. For example, output 42 may be configured to connect to other devices in a local area network (devices may include, e.g., transmitting devices as described herein, receivers as described herein, servers, routers, switches, laptops, etc.). Input 41 is configured to receive a data stream, configuration information, and preference information. The data stream may be transmitted, and the configuration and preference information may be utilized as described herein.

Figure 5:
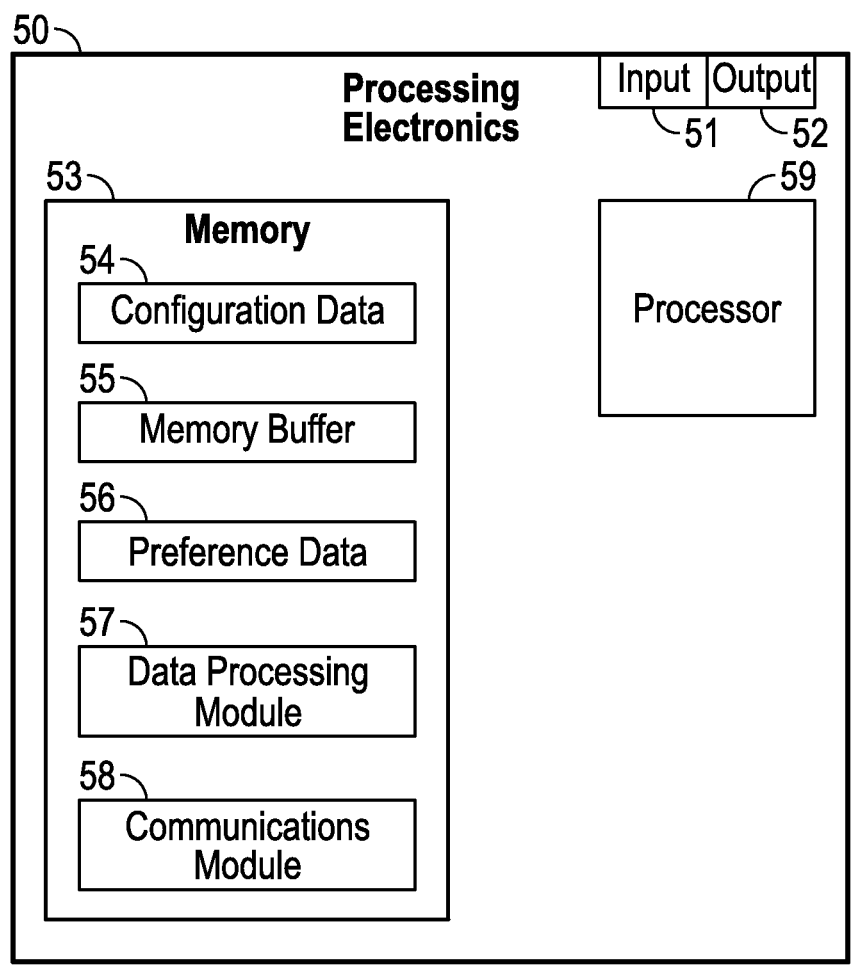
FIG. 5 is a detailed block diagram of processing electronics, show according to an exemplary embodiment.

Referring to FIG. 5, a more detailed block diagram of processing electronics 50 for completing the systems and methods of the present disclosure is shown, according to an exemplary embodiment. Processing electronics 50 may be processing electronics 32 of receiver 30 in FIG. 3, processing electronics 101 of receiver 100 in FIG. 10, or the processing electronics embedded within electronic devices 121 or 122 in FIG. 12. Processing electronics 50 are generally configured to receive an input stream of optically transmitted data. The data stream may be of bits or segments (e.g., network packets, a stream of video data, presentation data, image data, etc.) encoded in a light transmission. Processing electronics 50 are configured to process the data stream and assemble data based on the data stream. The assembled data may be network packets, image or video files, data files, etc., corresponding to the data stream. Processing electronics 50 are further configured to output the assembled data through output 52. For example, processing electronics 50 may receive a stream of bits through input 51 for a video stream that was transmitted using lasers. Processing electronics 50 may assemble networking packets from the bits and output the assembled packets through output 52. A networking device (e.g., a laptop computer, a tablet computer, a router, a cellular phone, etc.) may receive the packets and use them to view the video stream. As another example, the stream of bits may correspond to a web page. Processing electronics 50 may assemble networking packets from the bits and output the assembled packets through output 52. A networking device may receive the packets and use them to view the web page.

In an exemplary embodiment, processing electronics 50 is configured to function with two photodetectors and tunable filters. Configuration data 54 may provide information relating to the photodetectors and filters. Preference data 56 may provide information corresponding to a user's preference to receive data on a certain channel. Preference data 56 may also provide information corresponding to desired data transfer rate of the environment. Data processing module 57 may receive input data from the photodetectors at the specified data transfer rate and may assemble received data for output. It should be understood the scope of the present disclosure is not limited to two photodetectors and tunable filters.

Processing electronics 50 includes processor 59. Processor 59 may be implemented as a general purpose processor, an application specific integrated circuit (ASIC), one or more field programmable gate arrays (FPGAs), a group of processing components, or other suitable electronic processing components.

Processing electronics 50 includes memory 53. Memory 53 is one or more devices (e.g., RAM, ROM, Flash memory, hard disk storage, etc.) for storing data and/or computer code for completing and/or facilitating the various processes described herein. Memory 53 may be or include non-transient volatile memory or non-volatile memory. Memory 53 may include data base components, object code components, script components, or any other type of information structure for supporting the various activities and information structures described herein. Memory 53 may be communicably connected to processor 59 and includes computer code or instructions for executing one or more processes described herein.

Memory 53 includes memory buffer 55. Memory buffer 55 is configured to receive data through input 51. The data may be provided by sensors configured to detect light. The data may be bits of data, or correspond to other suitable protocols for transmitting data. The data may also include configuration or preference data provided by another electronic device. The data may be stored in memory buffer 55 and accessed by the modules of memory 53 as needed. As an example, configuration data 54 may be stored in memory buffer 55, and then accessed by data processing module 57 and communications module 58. Configuration data 54 may be used by data processing module 57 to configure a data processing rate or pattern. As another example, configuration data 54 may be used by data processing module 57 to configure channel information and to configure how data will be sent through output 52.

Memory 53 includes configuration data 54. Configuration data 54 includes data related to processing electronics 50. Configuration data 54 may include set up data and data used to configure communications between the various modules and components of processing electronics 50. Configuration data 54 may be used to set a data processing rate. Configuration data 54 may be also used to configure channels of data. Configuration data 54 may also be used to configure the format of output to be generated by processing electronics 50. For example, packets may be defined by a protocol specified in configuration data 54. Configuration data 54 may also be used to configure which sensors are active for receiving data and to tune filters to certain wavelengths. As an example, configuration data 54 may be used to activate four sensors out a possible six sensors.

Memory further includes preference data 56. Preference data 56 may be responsible for storing user preferences related to the reception and processing of data. For example, a user preference for receiving data on a certain channel may be stored within preference data 56. This information may be provided to data processing module 57 so the appropriate data is processed. In an exemplary embodiment, preference data 56 may store channel information corresponding to different locations. As an example, a user may have a preference to receive data on channel one while in the office, and to receive data on channel two while in the presentation room. As a further example, preference data 56 may store information corresponding to an optimal data transfer rate for a certain location.

Memory 53 further includes data processing module 57. Data processing module 57 is responsible for receiving input from sensors, processing the data, and assembling data. Data processing module 57 may receive data from multiple sensors. The data may include transmitted data, header information, media information, and control information. Data processing module 57 may receive configuration data or preference data corresponding to the channel information. Channel information corresponds to a channel used to transmit data by a transmitting device described herein. Data processing module 57 may temporarily store the received data in memory buffer 55. Data processing module may access memory buffer 55 and arrange the data corresponding according the channel information. Data processing module 57 may prepare the data to be sent to other devices. For example, the devices may include laptops, cellular phones, routers, switches, servers, desktop computers, etc. The data may be sent through output 52.

In an alternative embodiment, data processing module 57 may maintain statistics related to received and assembled data. Data processing module 57 may calculate a processing rate and provide feedback to a transmitting device. As an example, the feedback may be used by the transmitting device to optimize a transmission rate. Optimizing the transmission rate may include setting the data rate per wavelength channel based on the feedback. For example, the data rate may be set during an initial setup or initialization routine of the transmitting device, or the data rate may be set in real time. Feedback provided by data processing module 57 allows the transmitting device to measure the multipath properties of the room based on the feedback. For example, the transmitter may transmit test signals, and the feedback may correspond to reception or loss of the test signals. As another example, the feedback may contain timing information, reception information, data checksum information, error rate vs. data rate information, etc. The transmitter may process the feedback so that it may operate at the highest rate allowed by the particular environment. During an initial setup routine, the transmitter may set the data rate according to a particular receiver (in practice, the receiver placed in the worst location for reception). During real-time data rate adjustment, the transmitter may adjust the rate according to the feedback provided by each specific receiver during operation.

Memory 53 further includes communications module 58. Communications module 58 is configured to provide communication capability with other devices via output 52. As an example, the communications module 58 may be configured to provide information corresponding to data reception or data transfer rate to a network device. The communications module 58 may include logic for supporting communications protocols (e.g., internet protocol (IP), transmission control protocol (TCP), file transfer protocol (FTP), etc.) or supporting server-client or peer-to-peer network relationships. The communications module 58 may function in conjunction with data processing module 57 to transmit received data. In an exemplary embodiment, data processing module 57 assembles data as described herein and provides the data to communications module 58. As an example, communications module 58 may handle the generation or transmission of packets based on the data. Packets may be formed according to a particular protocol (e.g., IP, TCP, FTP, etc.). As another example, a TCP packet may be transmitted to a laptop computer for use in a networking operation.

Processing electronics 50 further includes input 51 and output 52. Output 52 is configured to provide an output to a device as described herein. For example, output 52 may be coupled to a tablet computer. The tablet computer may then receive optically transmitted network packets. The input 51 is configured to receive data from sensors, configuration information, and preference information.

Figure 6:
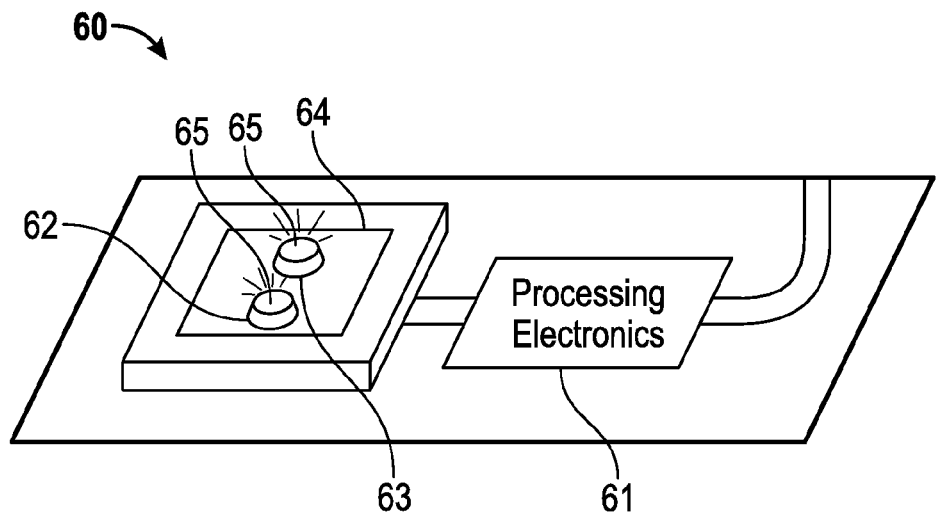
FIG. 6 is a schematic diagram of multi-wavelength VLC transmitting device, configured for the systems and methods of this disclosure, shown according to an exemplary embodiment.

Referring now to FIG. 6, a schematic diagram of multi-wavelength VLC transmitting device 60 is shown according to an exemplary embodiment. Transmitting device 60 includes processing electronics 61 and transmitter module 66. Transmitter module 66 includes lasers 62 and 63, and diffuser 64. The lasers may be laser diodes, VCSELs, VECSELs, or any suitable laser device, etc. The laser devices may form arrays, and arrays of devices may be assigned to a channel. The lasers may be wavelength-locked laser devices, or temperature controlled laser devices. The lasers are modulated by processing electronics as described herein. Laser 62 and laser 63 are configured to operate at non-overlapping wavelengths. As described herein, laser 62 may be responsible for transmitting a first data stream, and laser 63 may be responsible for transmitting a second data stream. Lasers 62 and 63 may be configured to operate on a single channel. Alternatively, laser 62 may be configured for channel one, and laser 63 may be configured for channel two. Diffuser 64 is configured so that signals 65 pass through diffuser 64. Diffuser 64 may include any device for spreading light. For example, diffuser 64 may include a Gaussian diffuser, imaging optics (e.g., diverging lenses), micro-optics, lenslet arrays, faceted reflectors, etc. Diffuser 64 shapes the output of signals 65 and prevents signals 65 from being hazardous. For example, diffuser 64 may provide a uniform intensity over a room (e.g., more light power in distant parts of the room), or it may spread the light according to a Gaussian pattern.

According to an exemplary embodiment, lasers 62 and 63 may be visible light laser diodes. For example, the lasers may be red light laser diodes. Transmitting device 60 may then supplement or replace the red output of a white LED device. For example, transmitting device 60 may be coupled to an LED sign in order to supplement a red LED of the sign. Transmitting device 60 may be configured to maintain an average color, brightness, and intensity that a red LED of the sign may have maintained. More specifically, transmitting device 60 may be configured such that a viewer would not be able to perceive a difference in the LED sign, even though a red LED has been supplemented with transmitting device 60.

According to an exemplary embodiment, lasers 62 and 63 may be individually modulated using a constant average duty cycle modulation pattern. In another embodiment, lasers 62 and 63 may be collectively modulated such that variations in average power and mean wavelength are not perceptible to a viewer.

According to an exemplary embodiment, transmitting device 60 may be incorporated into a lighting fixture that is color weighted or filtered. Transmitting device 60 may be configured to modulate lasers 62 and 63 such that a viewer would not be able to perceive any flickering. For example, transmitting device 60 may be incorporated into a filtered overhead lighting system of a conference room. In this manner, transmitting device 60 may produce an optically transmitted signal in conjunction with the lighting system such that white light is generated in the conference room. The white light has a pleasing overall spectrum.

Figure 7:
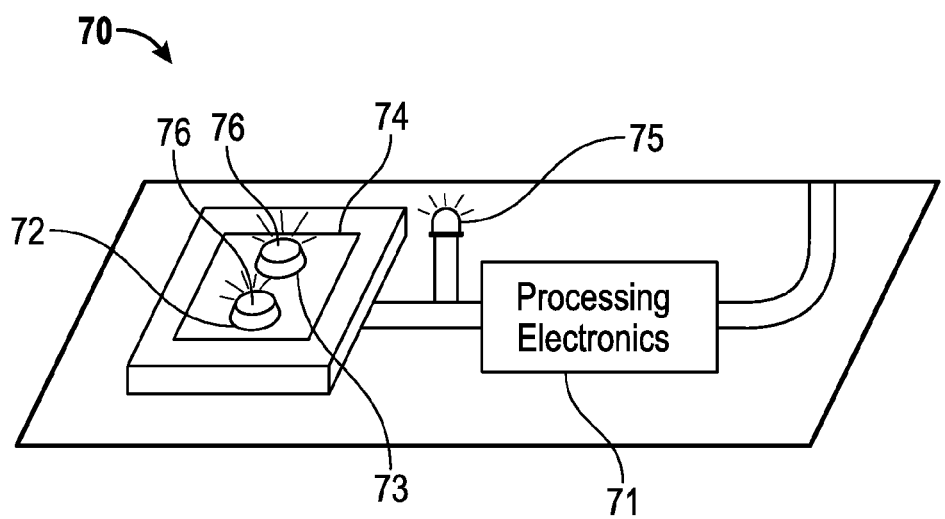
FIG. 7 is a schematic diagram of multi-wavelength VLC transmitting device, configured for using the systems and methods of this disclosure, shown according to an alternative embodiment.

Referring now to FIG. 7, a schematic diagram of multi-wavelength VLC transmitting device 70 is shown according to an exemplary embodiment. Transmitting device 70 includes processing electronics 71 and transmitter module 77. Transmitter module 77 includes lasers 72 and 73, and diffuser 74. Transmitting device 70 further includes LED illuminator 75. Lasers 72 and 73 are modulated by processing electronics as described herein. LED illuminator 75 is modulated in coordination with the modulation of the lasers in order to maintain desired overall color or brightness averages. Laser 72 and laser 73 are configured to operate at non-overlapping wavelengths. Diffuser 74 is configured so that signals 76 pass through diffuser 74. Diffuser 74 may uniformly diffuse the signals 76 and may prevent the signals from being a hazard.

It should be understood the scope of the present disclosure is not limited to transmitting devices containing only two lasers. Other configurations of lasers may be utilized without departing from the scope of the present disclosure.

Figure 8:
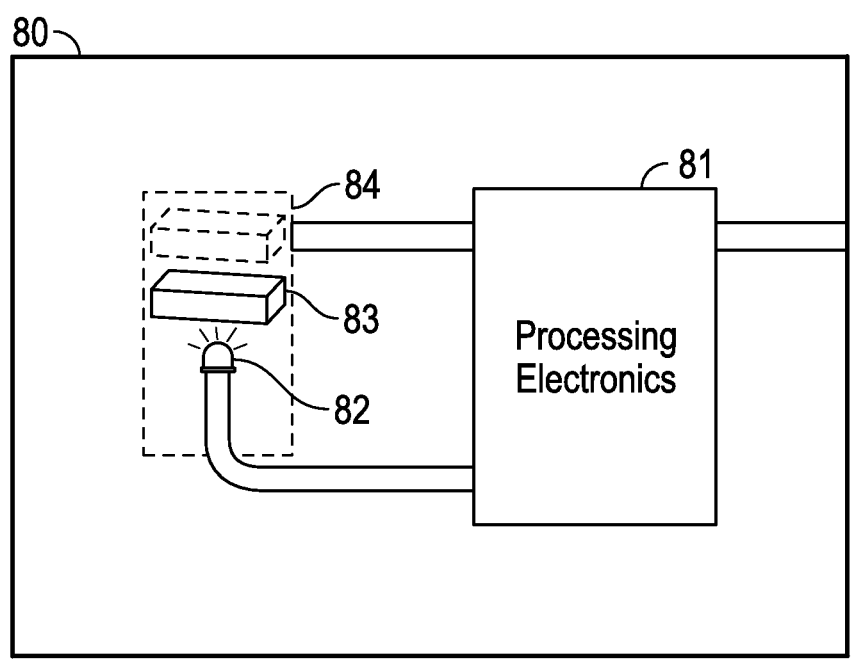
FIG. 8 is a schematic diagram of multi-wavelength VLC transmitting device, configured for the systems and methods of this disclosure, shown according to an exemplary embodiment.

Referring now to FIG. 8, a schematic diagram of multi-wavelength VLC transmitting device 80 is shown according to an exemplary embodiment. Transmitting device 80 includes processing electronics 81 and transmitter module 85. Transmitter module 85 includes LED 82, dispersive device 83, and modulation device 84. Dispersive device 83 separates a spectrum emitted from LED 82 into its component wavelengths. Processing electronics 81 control modulation device 84 to adjust the output of light. Processing electronics 81 may control modulation device 84 by generating modulation signals according to the methods described herein. Dispersive device 83 may be any device capable of separating a light spectrum into two or more wavelength segments. As an example, dispersive device 83 may be a prism and modulation device 84 may be a micromirror array. In another example, dispersive device 83 may include a grating, and the modulation device 84 may be LCD based. In yet another example, dispersive device 83 may also include other wavelength-dividing devices such as dichroic filters or materials, dichroic beamsplitters, etalons, etc.

In an exemplary embodiment, transmitting device 80 may be embedded in an LED display. The output of LED 82 may pass through a prism, and then modulated by modulation device 84 such that flickering may not be perceived by a viewer. As an example, transmitting device 80 may be sending an image file related to the LED display. A viewer of the LED display may utilize a receiver, such as receiver 100 in FIG. 10 to receive the image file.

It should be understood the scope of the present disclosure is not limited to transmitting devices containing only one LED. Other configurations of LEDs may be utilized without departing from the scope of the present disclosure.

Figure 9:
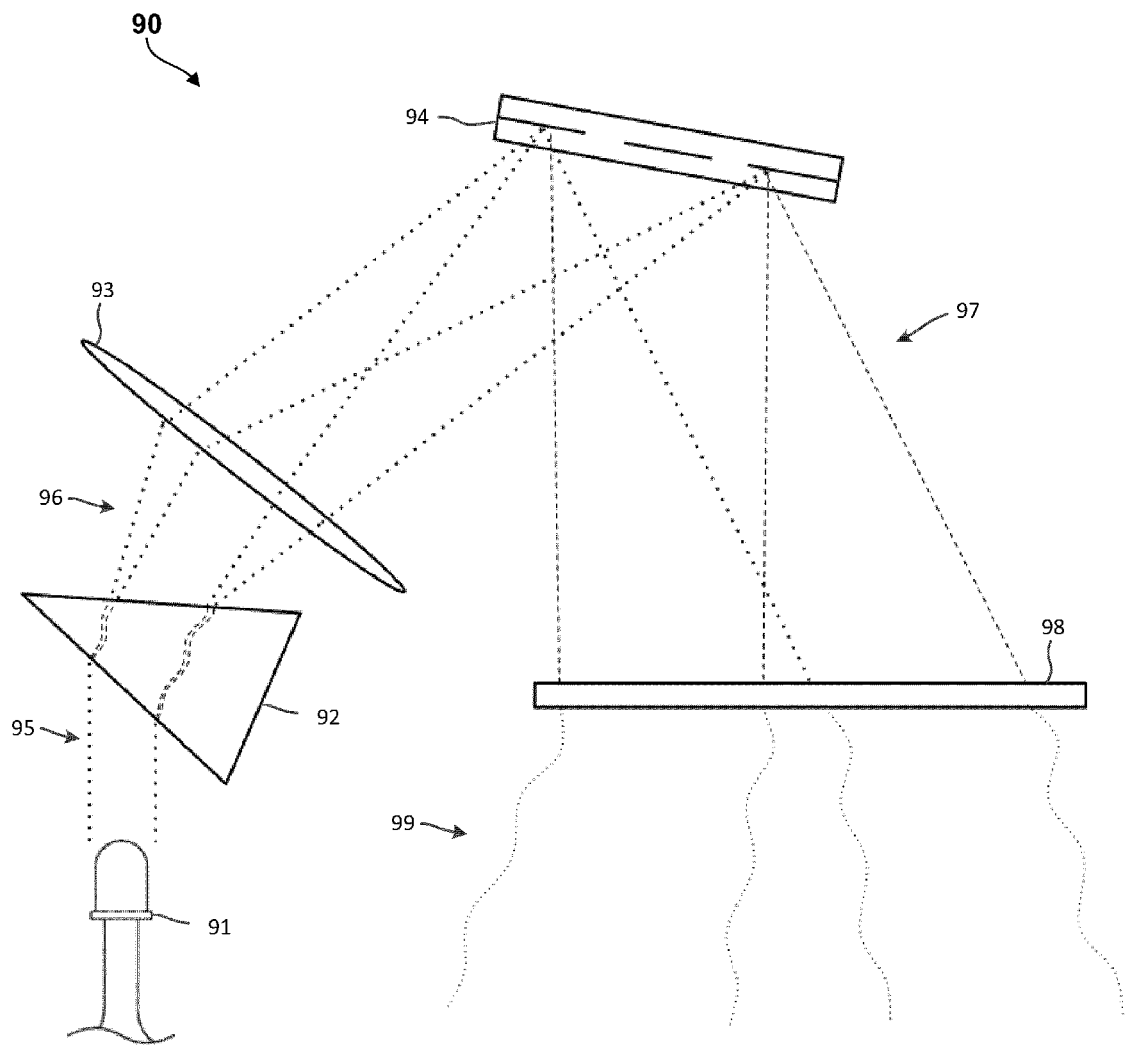
FIG. 9 is a detailed schematic diagram of a transmitter module, configured for using the systems and methods of this disclosure, shown according to an exemplary embodiment.

Referring now to FIG. 9, a detailed schematic diagram of transmitter module 90 is shown according to an exemplary embodiment. Transmitter module 90 may be transmitter module 85 of FIG. 8. Transmitter module 90 includes LED 91, prism device 92, lens device 93, micromirror array 94, and light spreader device 98 (e.g., a diffusing device, etc.). Prism device 92 may include multiple prism components, and lens device may include multiple lens components. The micromirror array 94 may be the modulation device 84 of FIG. 8, or may be any other light modulation device as described herein. LED 91 may illuminate and provide light 95, which includes light having a broad spectrum. Broad spectrum of light 95 passes through prism device 92, and prism device 92 device breaks spectrum of light 95 into its constituent spectral components 96. The spectral components 96 pass to micromirror array 94, and micromirror array 94 modulates and reflects portions of the spectral components 96 based on data and channel configurations, resulting in separately modulated spectral components 97. The separately modulated spectral components 97 pass through light spreader device 98, which distributes the separately modulated spectral components 97 over an area. In an exemplary embodiment, micromirror array 94 is controlled by processing electronics such as processing electronics 50 of FIG. 5.

As an example, LED 91 may be a blue LED. The blue LED may emit blue light of spectrum including wavelengths from 450-460 nm. The spectrum of blue light passes through prism device 92 and is broken up into its spectral components (e.g., blue light at 450 nm, blue light at 451 nm, blue light at 452 nm, blue light at 453 nm, etc.). The separated blue light passes through lens device 93 and reaches micromirror array 94, which modulates the separated spectral components of blue light. In this example, data to be transmitted on channel one may correspond to modulated blue light of 450-451 nm wavelengths, and data to be transmitted on channel two may correspond to modulated blue light of 452-453 nm wavelengths. Modulation can be produced by turning a mirror of micromirror array 94 on and off at a specified rate. The mirrors of the micromirror array 94 either reflect or divert the blue light in order to encode data therein. The mirror (or mirrors) corresponding to the blue light of a certain wavelength (e.g., 450 nm) are distinct from the mirror (or mirrors) corresponding to the blue light of another wavelength (e.g., 453 nm), which allows for simultaneous transmission. It should be understood that the scope of the present application is not limited only to blue LEDs, and other LED configurations are envisioned (e.g., green, red, phosphor-based, combinations of LEDs, etc.).

Figure 10:
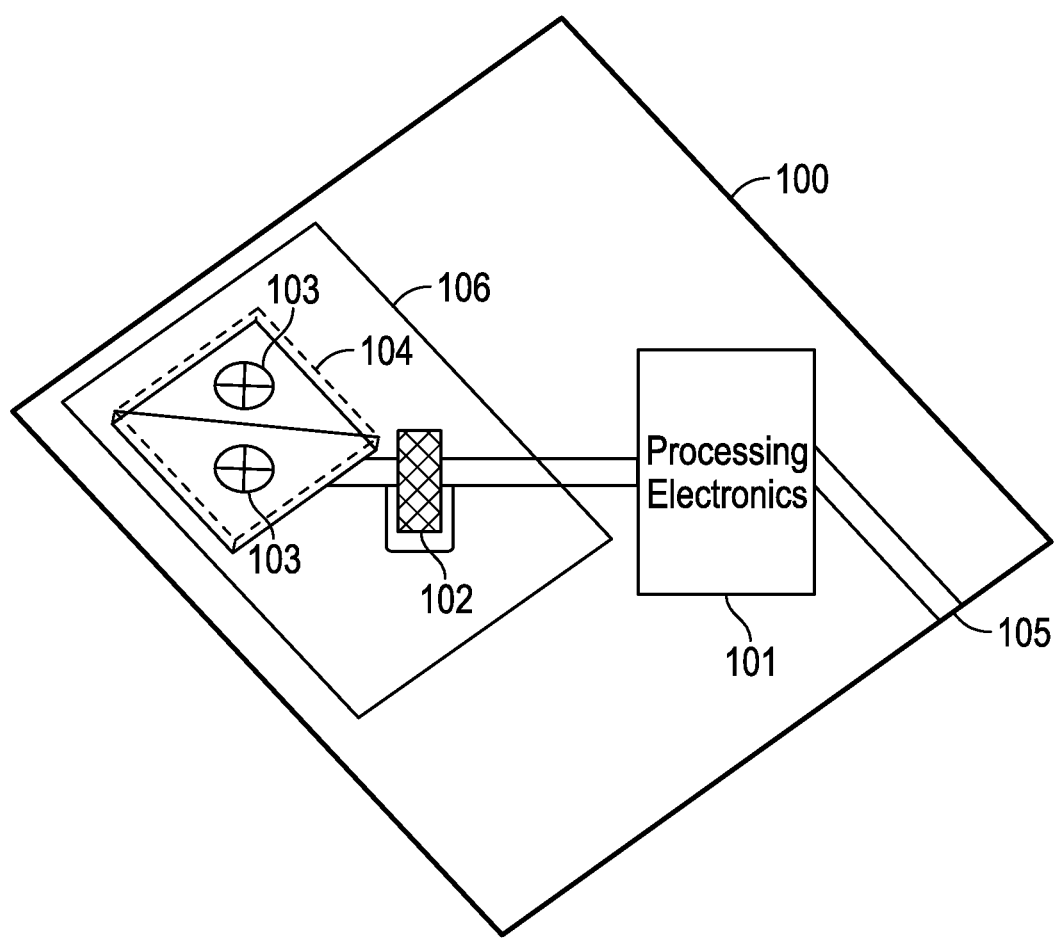
FIG. 10 is a schematic diagram of multi-wavelength VLC receiver, configured for using the systems and methods of this disclosure, shown according to an exemplary embodiment.

Referring now to FIG. 10, a schematic diagram of multi-wavelength VLC receiver 100 is shown according to an exemplary embodiment. Receiver 100 includes processing electronics 101 and sensor module 106. Sensor module 106 includes analog-to-digital module 102, photodetectors 103, and filters 104. Processing electronics 101 may be processing electronics 50 of FIG. 5, as discussed herein. Filters 104 allow certain wavelengths of light to pass through, and filter out other wavelengths. The wavelengths correspond to wavelengths of light that were used to transmit data optically according to the systems and methods herein. For example, a transmitting device such as transmitting device 60 in FIG. 6 may have transmitted data using a 650 nm red light configuration, and filters 104 may be configured to allow 650 nm light to pass, but filter other wavelengths. Photodetectors 103 are configured to sense light, and may be an array of at least two photodetectors on a common substrate. Output of photodetectors 103 may pass through analog-to-digital module 102, which may contain multiple analog-digital-converters. Photodetectors 103 may be photodiodes, active pixel sensors, charge-coupled devices, or any other sensor capable of detecting light. Output of the analog-to-digital module 102 may be connected to processing electronics 101. Processing electronics 101 may be configured according to the systems and methods described herein, and may process signals and generate data output. Processing electronics 101 may transmit data through its output (such as output 52 in FIG. 5) to output 105. Output 105 may be connected to an electronic device. As an example, processing electronics 101 may receive signals corresponding to a data transmission. Processing electronics may convert the signals to packets and send the packets via output 105 to a tablet computer. The tablet may utilize the packets in a networking operation.

In one embodiment, output 105 may be an Ethernet port. For example, an RJ45 Ethernet port. An electronic device, such as a laptop, may then be coupled to the Ethernet port, and may access data provided by receiver 100.

In one embodiment, filters 104 may be discrete wavelength filters of a filter array that covers numerous wavelengths. In another embodiment, filters 104 may be part of a continuous wavelength-gradient filter. In yet another embodiment, filters 104 may be tunable filters. Any tuning of filters 104 may be controlled by processing electronics 101. For example, the filtering specifications may be configured based on the light used by a particular transmitting device or according to channels of data. In this manner, a transmitting device may be transmitting data using red light, and filters 104 may be tuned to filter out non red light wavelengths. In another embodiment, filters 104 may be configured based on a certain channel of data that a user desires to receive.

In another embodiment, the outputs of photodetectors 103 may be selectively switched. For example, the outputs of photodetectors 103 may be coupled to output amplifiers or comparators. The output amplifiers or comparators may be used to keep certain outputs active and leave other outputs inactive. In this manner, a receiver configured for N total channels may have M active channels, where M<=N. The active outputs may be switched in order to receive data on another channel.

Figure 11:
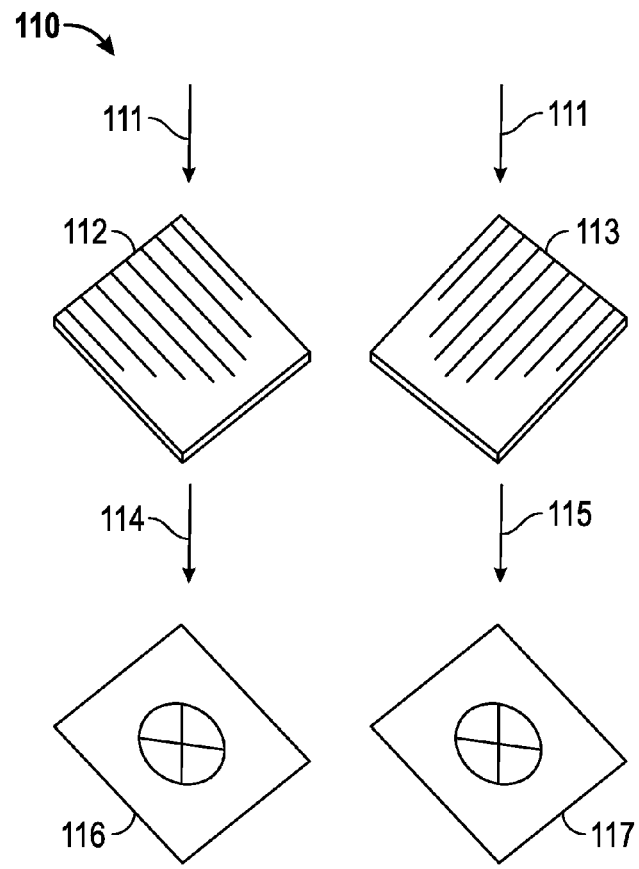
FIG. 11 is a detailed schematic diagram of a sensor module, configured for using the systems and methods of this disclosure, shown according to an exemplary embodiment.

Referring now to FIG. 11, a detailed schematic diagram of sensor module 110 is shown, according to an exemplary embodiment. Sensor module 110 includes filters 112 and 113, which correspond each to a photodetector 116 and 117, respectively. Modulated light 111 passes through filters 112 and 113, resulting in filtered light 114 and 115. Filtered light 114 has wavelength properties corresponding to the specifications of filter 112. Similarly, filtered light 115 has wavelength properties corresponding to the specifications of filter 113. Filters 112 and 113 may be each configured according to a channel of data. For example, channel one data may be transmitted using red light, and channel two data may be transmitted using yellow light. Filter 112 may be configured to filter out non-red light, while filter 113 may be configured to filter out non-yellow light. Filtered light 114 may have a wavelength of 650 nm and filtered light 115 may have a wavelength of 570 nm. Thus, photodetectors 116 and 117 would receive only red or yellow light, respectively.

In an exemplary embodiment, there are numerous photodetectors corresponding to a gradient filter. The photodetectors may be configured in rows, or an array, based on the particular gradient filter. For example, there may be a row of ten photodetectors under the gradient filter corresponding to the 650-680 nm range of the filter, configured for reception of red light. The photodetectors may act in combination to detect any data transmitted using red light between 650-680 nm.

Figure 12:
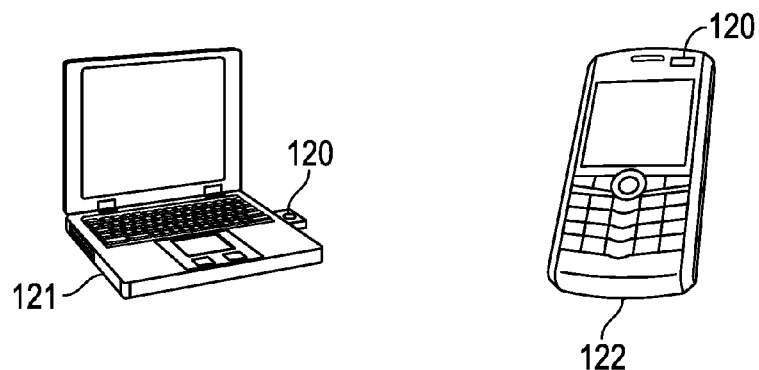
FIG. 12 is a schematic diagram of multi-wavelength VLC receivers coupled to electronic devices, shown according to exemplary embodiments.

Referring now to FIG. 12, a schematic diagram of multi-wavelength VLC receivers coupled to electronic devices are shown according to exemplary embodiments. Receiver 120 may be a receiver such as receiver 100 described in FIG. 10 herein. Receiver 120 may be coupled to electronic device 121 or embedded within electronic device 122. For example, receiver 120 may be connected to a laptop's Ethernet port. Data received by receiver 120 may then be transmitted to the laptop using a networking protocol. As another example, receiver 120 may be embedded in a cellular phone. The processing electronics and sensor module of receiver 120 may the processing electronics and sensors of the cellular phone. Data received by receiver 120 may be transmitted to the cellular phone through an internal connection.

Figure 13:
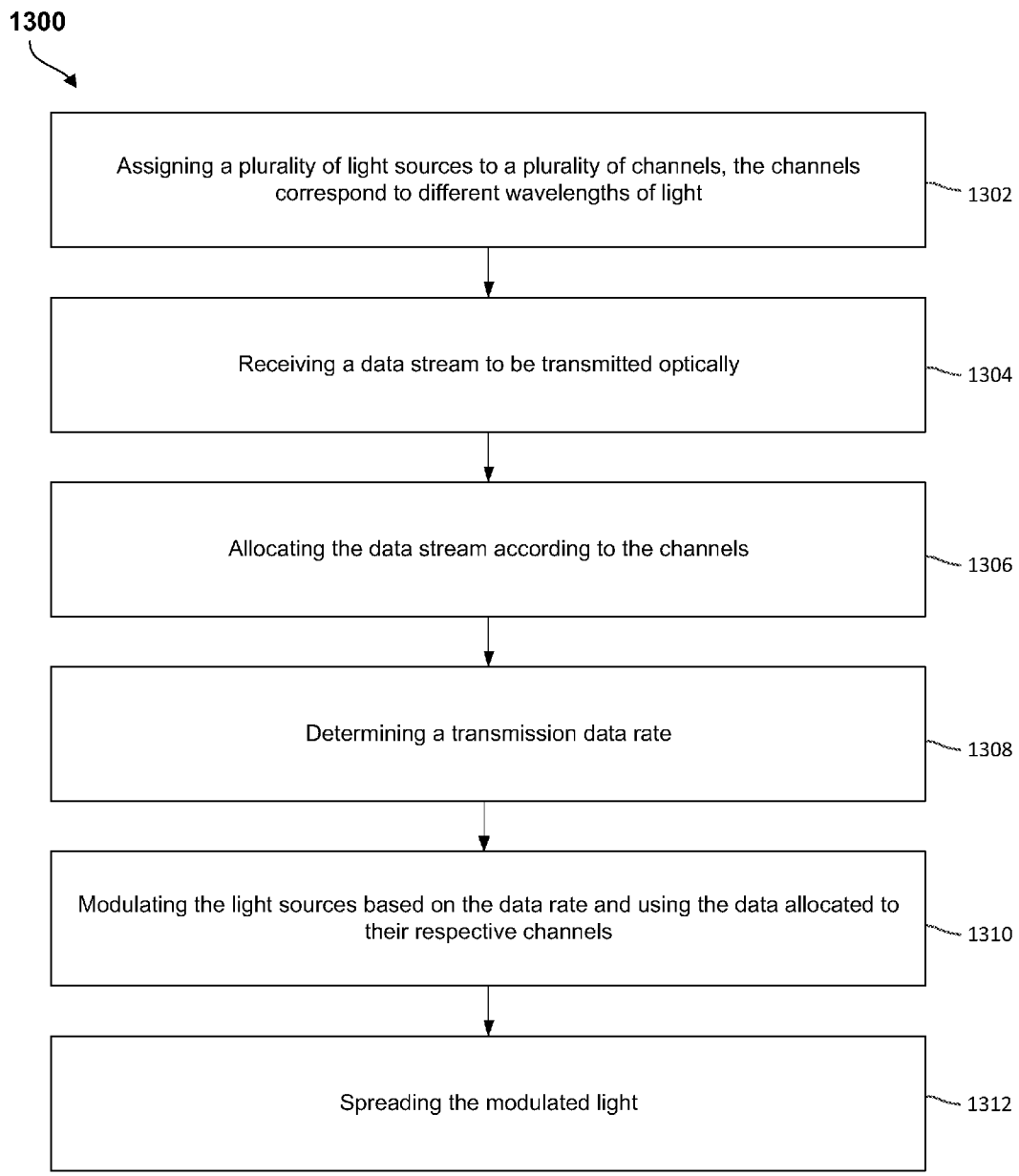
FIG. 13 is a flow diagram of a process for optically transmitting data according to an exemplary embodiment.

Referring now to FIG. 13, a flow diagram of a process 1300 for optically transmitting data is shown according to an exemplary embodiment. In alternative embodiments, fewer, additional, and/or different steps may be performed. Also, the use of a flow diagram is not meant to be limiting with respect to the order of steps performed. Process 1300 includes assigning a plurality of light sources to a plurality of channels (the channels correspond to different wavelengths of light used for multipath transmission) (step 1302). In an exemplary embodiment, the number of channels exceeds at least 3 channels. This allows process 1300 to take advantage of using lower data rates, but spreading a data transmission over the breadth of channels. Any number of light sources may be used as described herein (e.g., lasers, LEDs, non-monochromatic sources, etc.). Process 1300 further includes receiving a data stream to be transmitted optically (step 1304), allocating the data stream according to the channels (step 1306), and determining a transmission data rate (the transmission rate may be determined using feed back from a receiver device, an initialization process, and may be set from configuration setting, etc.) (step 1308). Process 1300 further includes modulating the light sources based on the data rate and using the data allocated to their respective channels (step 1310), and diffusing the modulated light with a diffuser in order to uniformly scatter or illuminate the environment. (step 1312).

Figure 14:
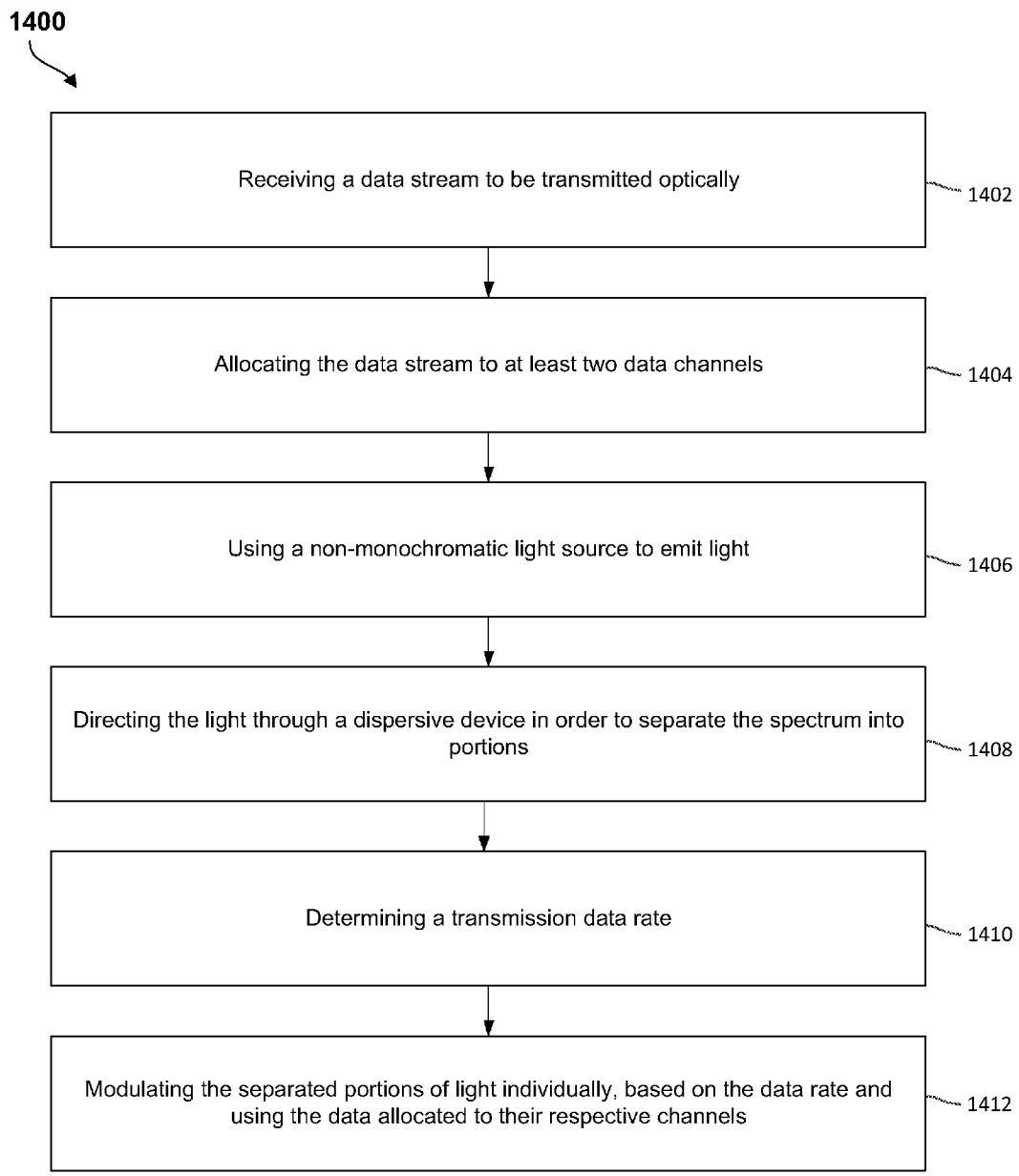
FIG. 14 is a flow diagram of a process for optically transmitting data according to an exemplary embodiment.

Referring now to FIG. 14, a flow diagram of a process 1400 for optically transmitting data is shown according to an exemplary embodiment. In alternative embodiments, fewer, additional, and/or different steps may be performed. Also, the use of a flow diagram is not meant to be limiting with respect to the order of steps performed. Process 1400 includes receiving a data stream to be transmitted optically (step 1402), allocating the data stream to at least two data channels (step 1404), using a non-monochromatic light source to emit light (step 1406), and directing the light through a dispersive device in order to separate the spectrum into portions (step 1408), where the portions of the spectrum correspond to different channels of data to be transmitted in parallel. Process 1400 further includes determining a transmission data rate (step 1410), and modulating the separated portions of light individually, based on the data rate and using the data allocated to their respective channels (step 1412).

Figure 15:
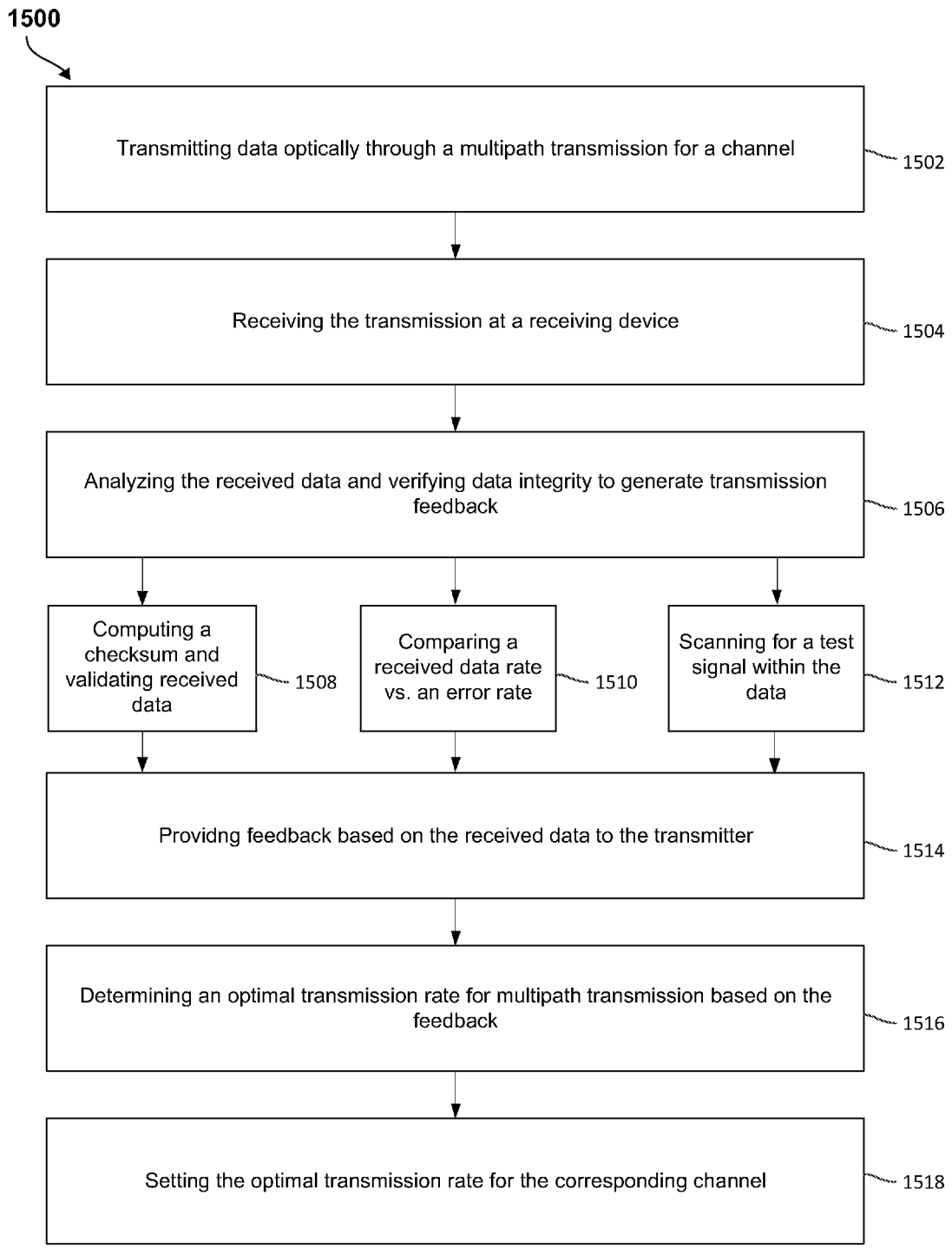
FIG. 15 is a flow diagram of a process for adjusting channel data rates according to an exemplary embodiment.

Referring now to FIG. 15, a flow diagram of a process 1500 for adjusting channel data rates is shown according to an exemplary embodiment. In alternative embodiments, fewer, additional, and/or different steps may be performed. Also, the use of a flow diagram is not meant to be limiting with respect to the order of steps performed. Process 1500 includes transmitting data optically through a multipath transmission for a channel (step 1502), receiving the transmission at a receiving device (step 1504), and analyzing the received data and verifying data integrity to generate transmission feedback (step 1506). The received data may be analyzed using any number of methods in order to generate feedback related to the data transmission. In an exemplary embodiment, analyzing the data includes computing a checksum and validating received data (step 1508). In another exemplary embodiment, analyzing the data includes comparing a received data rate vs. an error rate (step 1510). In another exemplary embodiment, analyzing the data includes scanning for a test signal within the data (step 1512). Process 1500 further includes providing the generated feedback to the transmitter, where the feedback is based on characteristics of the received data transmission (step 1514). Process 1500 further includes determining an optimal transmission rate for multipath transmission based on the feedback (step 1516), and setting the optimal transmission rate for the corresponding channel (step 1518).

Figure 16:
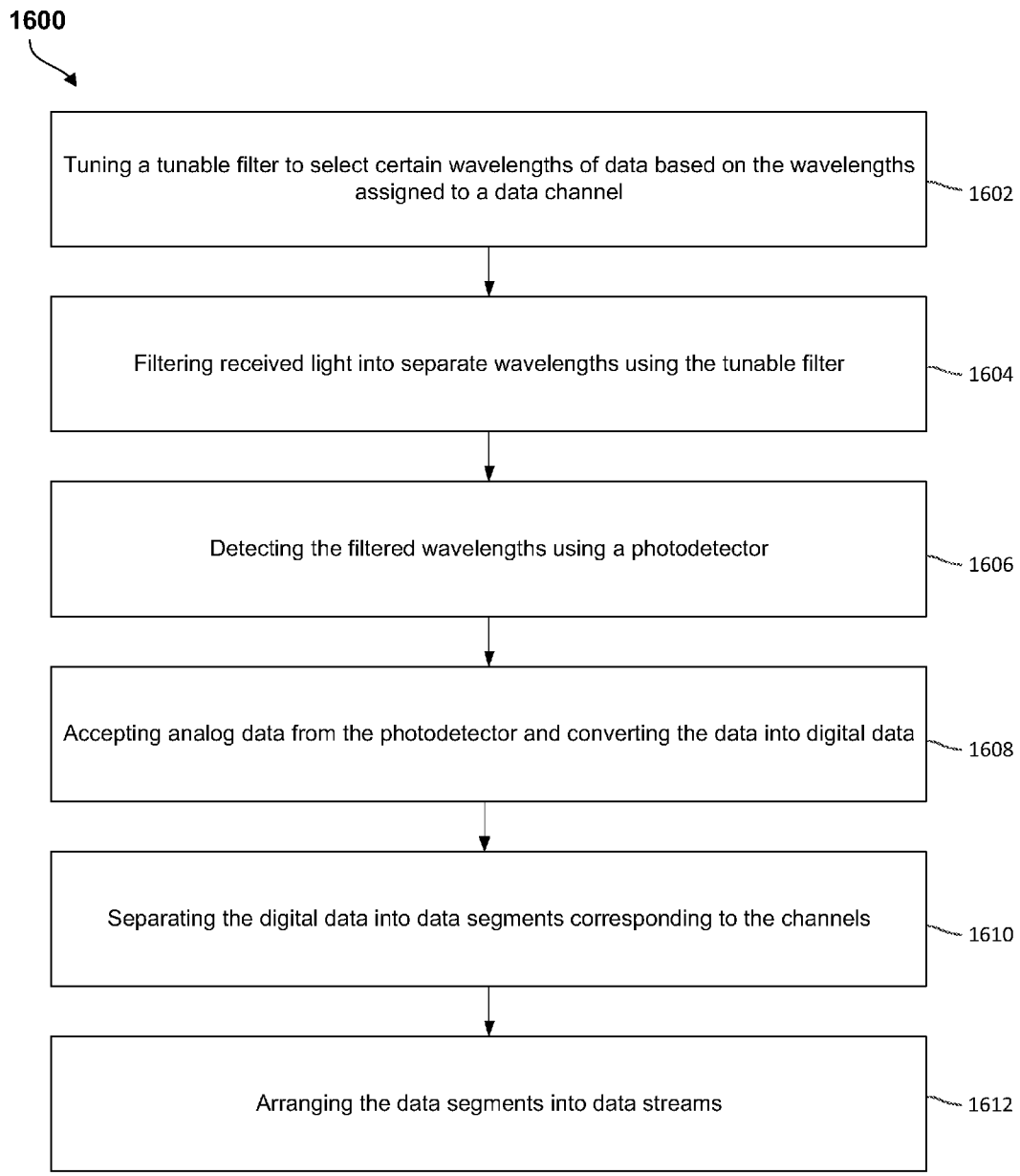
FIG. 16 is a flow diagram of a process for receiving multi-wavelength optical data according to an exemplary embodiment.

Referring now to FIG. 16, a flow diagram of a process 1600 for receiving multi-wavelength optical data is shown according to an exemplary embodiment. In alternative embodiments, fewer, additional, and/or different steps may be performed. Also, the use of a flow diagram is not meant to be limiting with respect to the order of steps performed. Process 1600 includes tuning a tunable filter to select certain wavelengths of data based on the wavelengths assigned to a data channel (step 1602), filtering received light into separate wavelengths using the tunable filter (e.g., allow certain wavelengths of light to pass through the filter) (step 1604), and detecting the filtered wavelengths using a photodetector (step 1606). Process 1600 further includes accepting analog data from the photodetector and converting the data into digital data (step 1608), and separating the digital data into data segments corresponding to the channels (step 1610), and arranging the data segments into data streams (step 1612). The data segments may be combined to form a single data stream corresponding to a particular channel of data, or the data segments may correspond to multiple channels of data, in which the data segments may be combined to form multiple data streams corresponding to each of the channels.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of process steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, method steps, processing steps, comparison steps and decision steps.

What is claimed is:
1. A system for optically transmitting data, comprising:
 a plurality of light sources configured to transmit light at non-overlapping wavelengths;
 processing electronics configured to:
  assign the plurality of light sources to a plurality of channels;
  accept a data stream;
  allocate the data stream to the channels;
  modulate a transmission of the light using the allocated data stream, wherein the allocated data used to modulate a first light source of the plurality of light sources is separate from the allocated data used to modulate a second light source of the plurality of light sources; and an optical spreader configured to spread the transmission of light;

wherein the modulation is configured to correspond to a transmission rate, wherein the transmission rate is less than an inverse of an optical multipath time in an environment.

2. The system of claim 1, wherein the modulation is configured such that a constant visual brightness and color are maintained.

3. The system of claim 1, wherein the modulation is configured such that each light source transmission individually has a constant average-duty-cycle modulation.

4. The system of claim 1, wherein the modulation is configured such that any variations in average power and mean wavelength of the light collectively are not perceptible to a human eye.

5. The system of claim 1, wherein the modulation is adjusted based on feedback from a receiver.

6. The system of claim 5, wherein the feedback corresponds to a transmission rate.

7. The system of claim 5, wherein the feedback corresponds to an error rate.

8. The system of claim 1, wherein the light sources are integrated into illumination devices, wherein the illumination devices are configured to provide visible illumination.

9. The system of claim 1, wherein the light sources are further configured to supplement or replace a red, green, or blue range of light output from an LED system.

10. The system of claim 1, further comprising LED illuminators, and wherein the processing electronics are further configured to modulate the LED illuminators in coordination with the modulation of the transmission of the light in order to maintain a desired overall color.

11. The system of claim 1, wherein the light sources are each wavelength-locked.

12. The system of claim 1, wherein the light sources are collectively wavelength-locked.

13. The system of claim 1, wherein the channels are assigned based on a wavelength of each light source.

14. The system of claim 1, wherein the channels are assigned based on a user's data rate requirements.

15. The system of claim 1, wherein the channels are assigned based on a channel directory, and wherein the channel directory includes information related to an optical communication network.

16. The system of claim 15, wherein the channel directory is broadcast on a preset optical transmission channel.

17. The system of claim 15, wherein the channel directory is broadcast by a non-optical communication source.

18. The system of claim 1, wherein the optical spreader includes a microlens array.

* * * * *